Oct. 28, 1969  W. J. GUNDLACH  3,474,880
COMBINED ACTUATOR AND CATCHER FOR GAS EXPLODERS

Filed Nov. 12, 1968  3 Sheets-Sheet 1

INVENTOR.
WILLIAM J. GUNDLACH
BY
ATTORNEY

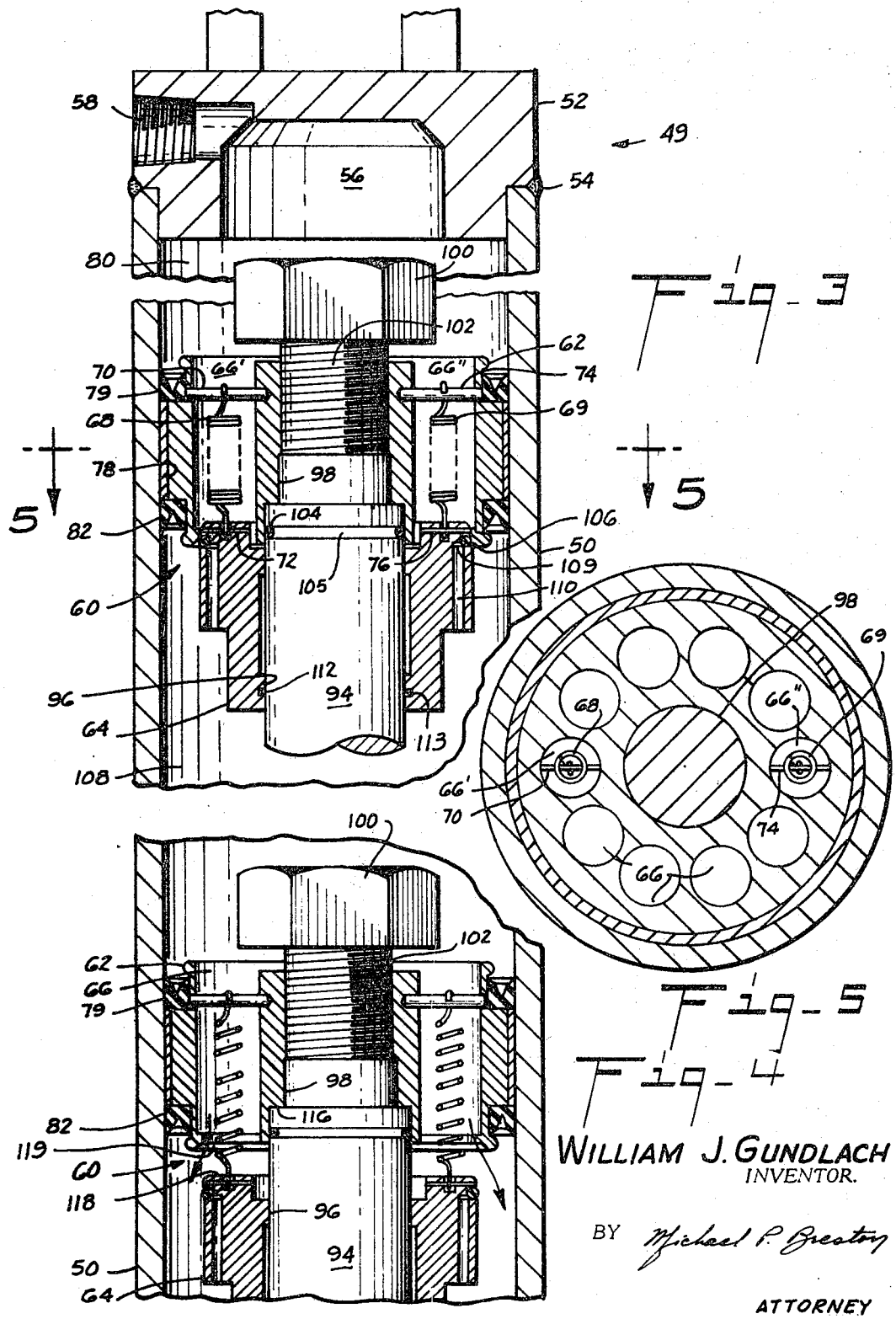

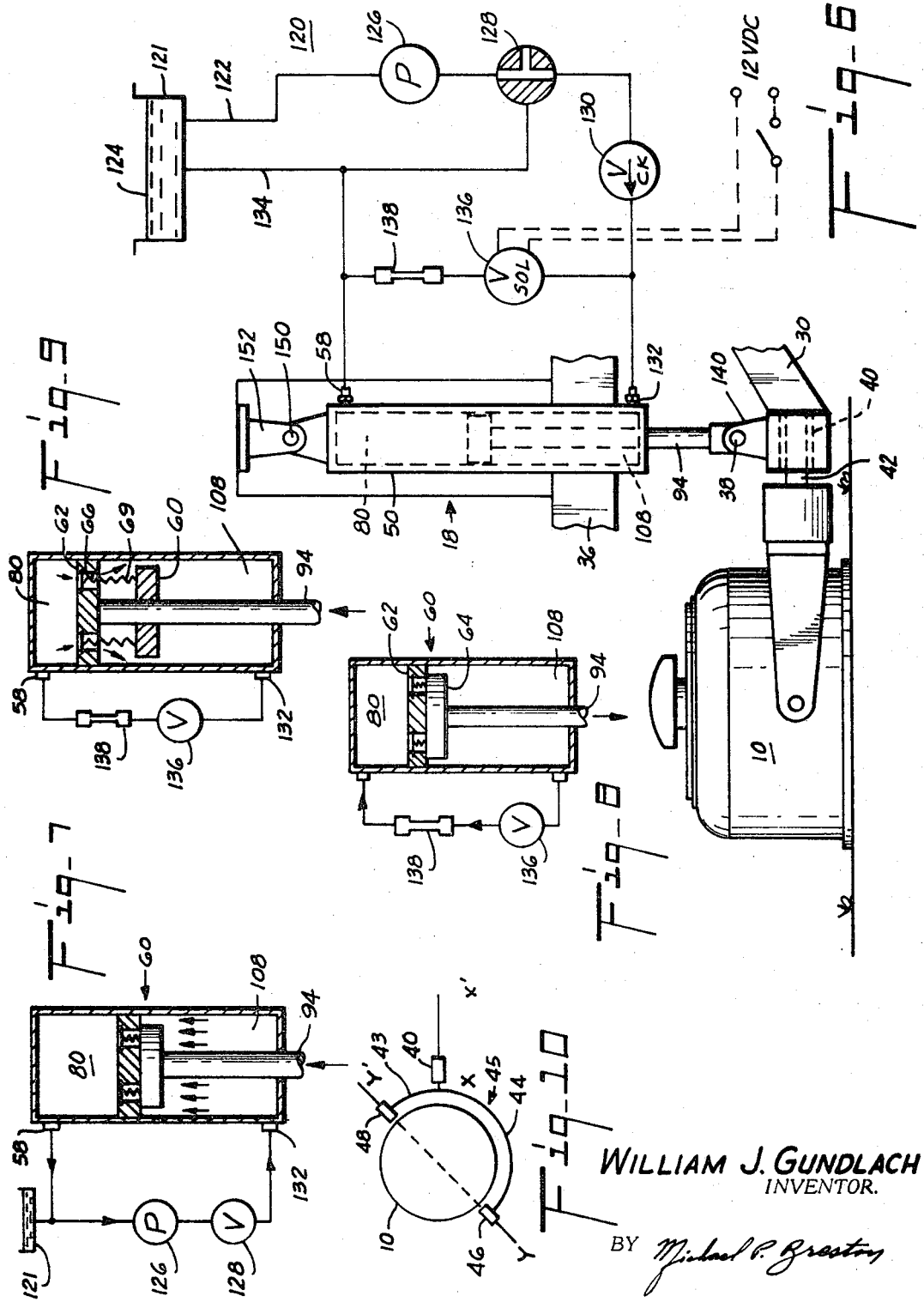

United States Patent Office 3,474,880
Patented Oct. 28, 1969

3,474,880
COMBINED ACTUATOR AND CATCHER FOR GAS EXPLODERS
William J. Gundlach, Fulshear, Tex., assignor to Geo Space Corporation, Houston, Tex., a corporation of Texas
Filed Nov. 12, 1968, Ser. No. 774,738
Int. Cl. G10k 11/00; G01v 1/00
U.S. Cl. 181—.5       10 Claims

ABSTRACT OF THE DISCLOSURE

An actuator adapted to raise and lower a seismic gas exploder and to limit the rate of the downfall of the exploder when it reaches its maximum height subsequent to an explosion. By forcibly retarding the exploder in its downward motion, the generation of undesirable seismic waves into the surrounding medium is avoided.

BACKGROUND OF THE INVENTION

This invention relates to actuating mechanisms for seismic gas exploders and is especially adapted to the type known in the trade as Dinoseis (trademark of Sinclair Research, Inc.). Gas exploders of this type are described in several U.S. patents including U.S. patents of Loren G. Kilmer, Nos. 3,235,027, 3,295,630 and 3,374,854. Several types of gas exploders are known. The actuator of this invention will nevertheless find utility with most other land gas exploders. For a full understanding of this invention, it is believed sufficient to described the application of this invention to gas exploders of the Dinoseis type only.

Basically, such an exploder includes a vertically extensible closed chamber having a bottom plate for coupling the exploder to the surrounding medium. Frequently, a rigid, heavy-weight top is positioned over the sidewall of the extensible chamber. Through one or more inlets in the top, gases are allowed to enter the chamber for becoming periodically ignited to produce the desired seismic disturbances or waves.

Just as several types gas exploders are known so are various types carriers known. These carriers permit seismic exploders to become rapidly transported even over very rough terrains. Such carriers sometimes include what are known in the trade as "catchers" for the purpose of "catching" the exploder on the fly and gradually cushioning its downfall thereby preventing the generation of undesirable secondary seismic waves. The need for and the function of such catchers is mentioned in said U.S. Patent 3,235,027, column 6, lines 1–5. In addition to some kind of catching device, there is also generally provided on such carriers a hydraulically operated piston connected to the gas exploder for selectively lifting the exploder prior to and after the seismic "shooting."

In accordance with this invention, a new and improved hydraulically operated actuator is provided which combines both the catching and lifting functions normally respectively performed by the catcher and the piston.

SUMMARY OF THE INVENTION

In accordance with this invention a new and improved actuator is provided for use especially with seismic gas exploders. The actuator is fluid operated and includes a cylinder defining an upper and a lower chamber. In the cylinder is a rod fixedly supporting a power piston and slideably supporting a control piston. When it is desired to raised or to lower the exploder, both pistons act as a unit piston the function of which is similar to a conventional piston. However, after an internal explosion in the gas exploder, the function of the actuator becomes that of a catcher which allows the exploder to slowly descend to the ground thereby eliminating the generation of undesirable secondary seismic impulses. Immediately after the exploder is fired it jumps from the ground and exerts an upward force on the rod supporting the pistons. The rod then exerts a sudden force on the power piston causing it to separate from the control piston. Resilient means determine the maximum allowed separation between the pistons. As a result of the inter-piston separation, fluid confined in the upper chamber controlled by the power piston is allowed to enter through the power piston past the control piston into the lower chamber.

As soon as the exploder starts returning to ground the two pistons become reunited thereby preventing any further fluid flow between the upper and lower chambers through the power piston. The upper and lower chambers are externally inter-connected whereby fluid gradually flows out from the lower chamber into the upper chamber, the rate of flow will determine the rate of downfall of the exploder.

Accordingly it is a main object of this invention to provide a new and improved fluid operated actuator which combines several desirable functions previously accomplished by different devices.

It is another object of this invention to provide a new and improved fluid operated actuator which is economical to manufacture, easy to service and is extremely reliable under severe operating conditions.

It is a further object of this invention to provide a new and improved fluid operated actuator which is easy to couple to conventional gas exploders.

Yet it is a further object of this invention to provide a new and improved fluid operated actuator which substantially eliminates the generation of undesirable seismic impulses.

It is another object of this invention to provide a new and improved fluid operation actuator which substantially reduces the destructive forces exerted by the exploder on its carrier as well as on the operator.

These and other objects of this invention will become apparent from a description of preferred embodiments of this invention, which embodiments are more clearly described in the following drawings, in which:

FIGURE 3 is a cross-section of the actuator with both pistons united;

FIGURE 4 is a view similar to FIGURE 3 but with both pistons separated;

FIGURE 5 is a sectional view of the power piston along line A—A in FIGURE 3;

FIGURE 6 is a diagrammatic representation of an hydraulic system controlling the actuator;

FIGURES 7 through 9 are schematic representations useful in understanding the operation of the hydraulic system shown in FIGURE 6; and FIGURE 10 is a schematic representation of the mounting of the gas exploder shown in FIGURE 1.

Figures 1, 2:
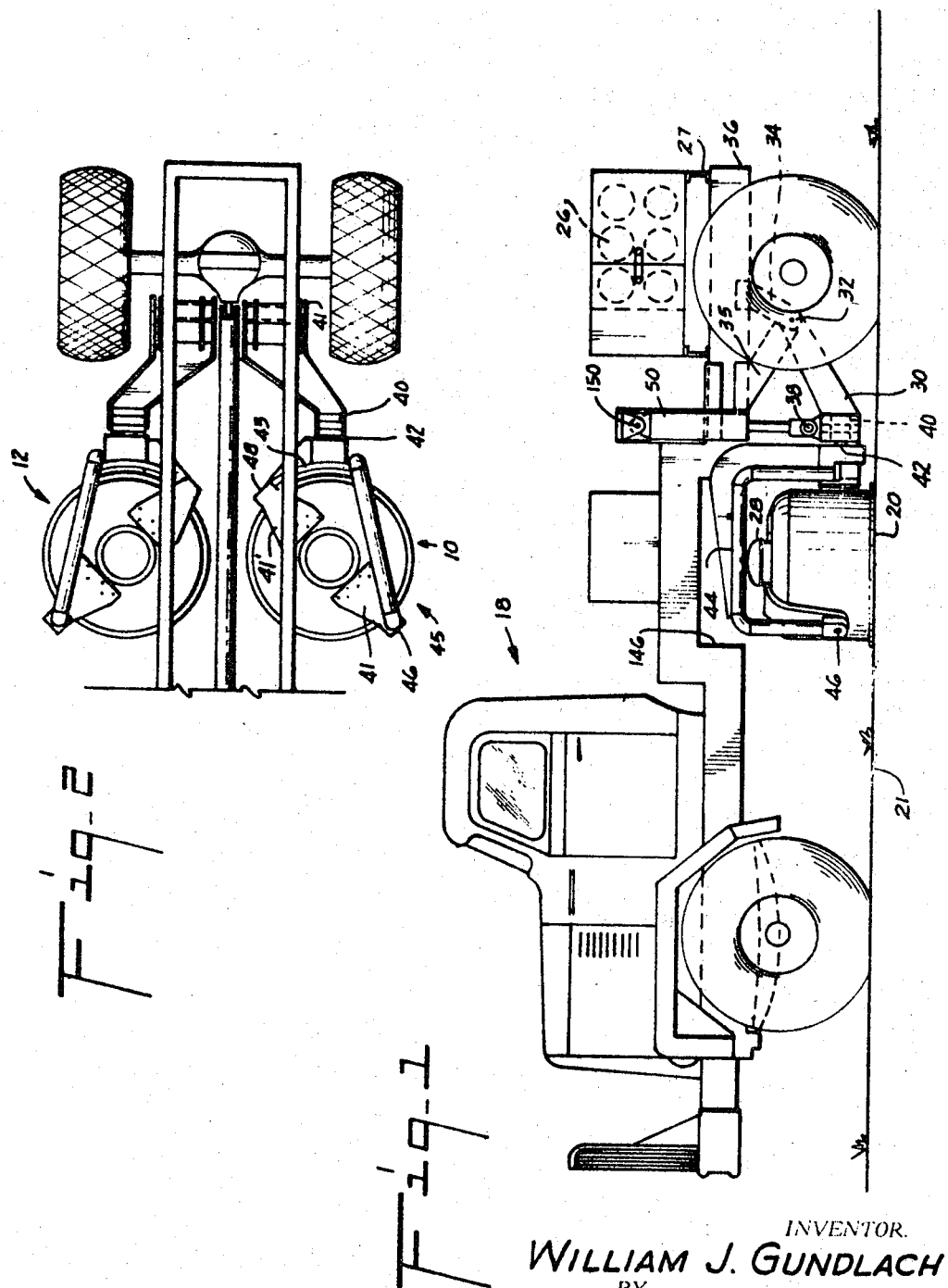
FIGURE 1 is a side elevation of two seismic wave generators controlled by the actuators and suspended to a carrier in accordance with this invention.
FIGURE 2 is a rear top view of the carrier shown in FIGURE 1.

Referring to the drawings and more particularly to FIGURES 1 and 2, there are shown two gas exploders 10, 12 independently and pivotally mounted on a carrier vehicle generally designated as 18. The vehicle transports generators 10, 12 for selective emplacement in different locations. As previously mentioned, no detailed description of the exploders is believed necessary for an understanding of this invention. Moreover, since exploders 10 and 12 are in all respects identical, a brief description will be given of exploder 10 only.

Exploder 10 has a bottom plate 20 and an internal combustion chamber (not shown) for periodically receiving a charge of explosive gases. After the gases become ignited the bottom plate 20 is rapidly accelerated against ground 21. Conveniently, the gases required to create the internal explosion within each exploder are carried in tanks 26 on a rear platform 27. An exhaust stock 28 allows the burned gases to vent to the outside. The respective mountings for exploders 10 and 12 are in all respects identical hence the mounting of only exploder 10 will be described hereinafter.

A yoke 30 is pivotally mounted on a pivot 32 supported by two beam members 43, 35 both fixedly secured to the bed 36 of the carrier 18. The other end of yoke 30 is supported on a pivot 38 and is arranged to receive a sleeve bearing 40. A shaft 42 rotates inside the sleeve bearing 40. A generally U-shaped support arm 44 is provided, as well as two support brackets 41, 41'. The brackets are fixedly secured to the exploder 10. A bearing 46 rotatably supports exploder 10 on one end of arm 44 and a bearing 48 rotatably supports the exploder 10 on an arm 43. The other end of arm 44 is fixedly secured, as by welding, to arm 43 and to an extension of shaft 42. Referring to FIGURE 10 it can be seen that the exploder 10 is free to rotate about the axis X—X of shaft 42 and about the axis Y—Y through bearings 46, 48, both rotations being within predetermined limits. For the sake of convenience the Y—Y axis is at an angle of approximately 45° with respect to the X—X axis. It will be appreciated by those familiar with gimbal mountings that each exploder can establish proper contact with a variably sloping ground 21 within predetermined angular limits.

Referring now more particularly to FIGURES 3-5 there is shown a raise-lower-catch hydraulic actuator, generally designated as 49, having a cylinder 50 and a cylinder head 52 welded to the cylinder 50 as at 54. The cylinder head defines a counter bore 56 and a port 58. A piston assembly generally designated as 60, inside the cylinder 50, includes a cylindrical power piston 62 and a fluid control piston 64. Depending on the relative positions of pistons 62 and 64, power piston 62 will act either as a conventional power piston or as a fast-acting valve. In accordance with this invention, the power piston 62 is provided with at least one but preferably several longitudinal bores. In one embodiment ten bores 66 were provided as better shown in FIGURE 5. Fully extending through two bores 66', 66" which may be diametrically opposed are springs 68, 69 the respective ends of which are attached to pins 70, 72 on one hand, and to pins 74, 76 on the other hand.

The power piston 62 slides on the inner cylindrical wall of cylinder 50. The sliding surface on the power piston 62 is made of a brass finish 78. Pins 70 and 74 are held in place by a U-cup shaped rubber seal 79 which retains the pins in place and provides a seal for the upper chamber 80 defined between the cylinder head 52, the walls of cylinder 50 and the piston assembly 60. The bottom surface of the power piston 62 is similarly provided with such a U-cup rubber seal 82 which seals a lower chamber 108, formed between the walls of the cylinder 50 and the bottom face of power piston 62.

A longitudinal rod 94 extends through the center bores 96, 98 in the control and power pistons 64, 62 respectively. A nut 100 fixedly secures the power piston to the rod 94 and is threadably engaged unto the threaded end 102 of rod 94. The nut 100 fits into the counter bore 56 when the rod is in its uppermost position inside the cylinder head 52.

Whereas the power piston 62 is secured to the rod 94 the control piston slides on the rod 94 as will be described hereinafter. An O-ring 104 on the tip of rod 94, in a groove 105, and an O-ring 106 at the upper face of control piston 64 seal the bottom chamber 108 off from the upper chamber 80. To prevent the O-ring 106 from slipping out from its position due to a pressure differential between the upper chamber 80 and the lower chamber 108 a radially extending groove 109 is provided which communicates with a group of axially extending holes 110, equalizing the pressure on both sides of the O-ring 106. A shoulder 116 on rod 94 provides a seat for the power piston 62. The upper face 118 of the control piston 64 fits snugly against a matching lower face 119 of the lower piston 62. An O-ring 112 in a groove 113 at the lower end of the control piston 64 prevents fluid flow through the inner bore 96 of the control piston 64.

Thus it will be appreciated that when the control piston 64 is pressed against the power piston 62, the O-rings 104, 106 and 112 allow both pistons 62, 64 to act as the unitary piston system 60. United piston 60 in connection with the rod 94 and the cylinder 50 operate in a conventional manner in raising rod 94 and hence any load, such as exploder 10, connected thereto. When both pistons 62 and 64 are forced together into a united piston 60, the upper chamber 80 is effectively sealed off from the lower chamber 108 and any hydraulic communication therebetween is now external to the cylinder 50. On the other hand, when the control piston 64 is caused to become separated from the power piston 62 the power piston 62 acts as an open valve for passing fluid through the bores 66 from the upper chamber 80 to the lower chamber 108.

Referring to FIGURES 6–9 the hydraulic system generally designated as 120 is schematically represented. A sump or reservoir 121 of hydraulic fluid 124 is placed at a relatively elevated position on the bed 36 of the carrier vehicle 18 so as to feed, if necessary, by gravity hydraulic fluid to the hydraulic cylinder 50. A hydraulic fluid line 122 feeds the fluid 124 to a pump 126 and to a three-directional valve 128. A single directional valve 130 allows the fluid to enter the lower port 132 of the cylinder 50. Another line 134 establishes direct communication between the reservoir 121 and the upper port 58 of the cylinder 50. Connected across lines 134 and 122 is a solenoid operated valve 136 electrically operated from the battery voltage on the vehicle 18. Connected in series with the solenoid valve is a restriction orifice 138. The lower end of the rod 94 is pivotally connected by pivot 38 to a yoke member 140 mounted on the support arm 30 and the sleeve bearing 40. The hydraulic cylinder is pivotally mounted on a pivot 150 fixedly secured to an extending yoke 152 on the bed of the vehicle.

The points of freedom of rotation of exploder 10 are located in a plane passing through the center of gravity of the gas exploder 10. To accommodate a relatively high exploder, it was convenient to provide (see FIGURE 1) an offset 146 in the bed 36 of the vehicle 18 in order to accommodate the exploder immediately after the occurrence of an explosion. The exploder normally raises from ground a distance of about 12 inches.

The operation of the hydraulic system 120 will now be described with greater reference to FIGURES 7–9. When the gas exploder 10 is in contact with ground 21 to perform a lifting operation of the exploder, solenoid valve 136 is closed and valve 128 is operated and placed in its lifting position as shown in the drawing. Fluid now flows from the reservoir 120 through pump 126, valve 128, check valve 130, lower port 132, and into the lower chamber 108. The fluid pressure is exerted on the united piston 60 which becomes elevated as shown in FIGURE 7 thereby raising the rod 94. The raising of rod 94 causes support arm 42 to lift the gas exploder 10. The lifting of the exploder 10 is usually performed prior to moving the vehicle to another location. In sum, fluid enters the lower chamber 108 through port 132 and exits from the upper chamber 80 through port 58 back into the reservoir 124. It will be appreciated that the directional valve 128 prevents fluid from entering line 123 which ordinarily couples pump 126 directly to the reservoir when valve 128 is in its unactuated position.

To lower the exploder, the pump 126 is either not working or is idling through line 123 with a valve 128 in its normal position which is 90° counterclockwise from the position shown in the drawing. The solenoid valve 136 is open thereby allowing fluid to flow only from the lower chamber 108 into the upper chamber 80 via the restriction 138 as schematically represented in FIGURE 8. The weight of the gun exerts the necessary downward pressure for the fluid transfer from the lower chamber 108 into the upper chamber 80 of the cylinder 50. In the lowering and raising functions of the hydraulic cylinder 50 both the control and power pistons 62, 64 form the unitary piston 60 and hence the function of the hydraulic actuator is rather conventional during these functions.

In accordance with this invention the hydraulic actuator performs also the desirable function of allowing the gun after an internal explosion takes place to slowly descend to the ground thereby eliminating the generation of undesirable secondary seismic waves. Referring now more particularly to FIGURES 6 and 9, with solenoid valve 136 still open as in the lowering function, the exploder is fired thereby causing the exploder to jump from the ground and exerting an upward force on the yoke 140 and hence on the rod 94. The rod in turn exerts an upward lift on the power piston 62 thereby causing a separation between the power piston 62 and the control piston 64. The maximum space separation between the two pistons is determined by the springs 68 and 69. The fluid from the upper chamber 80 is now allowed to flow through the bores 66 in the power piston 62 into the lower chamber 108 during the upward travel of the exploder and hence rod 94. Since the cross-sectional area of the upper port 58 is relatively small compared to the total cross-sectional areas of the bores 66, it may be considered that the upper port 58 is closed for all practical purposes. The rapid upward acceleration of the power piston 62 causes a low pressure to become established at the lower face of the power piston which even further accelerates the flow of fluid between the upper and lower chambers 80, 108. At the instant when the exploder reaches its maximum height during its upward trajectory, due to its substantial weight it causes the control piston 64 to become reunited with the power piston 62 thereby prevening any further fluid flow inside the cylinder 50 between the upper chamber 80 and the lower chamber 108. Since solenoid valve 136 remained continuously open during the firing operation, the fluid can only flow out through valve 136 and the restriction orifice 138, the amount of fluid flow being controlled by the cross-sectional area of the restriction orifice 138. It will be noted that due to the check valve 130 no fluid can flow in the direction opposite to that indicated by the arrow. Since the amount of fluid flow from the lower chamber 108 of the hydraulic cylinder 50 is limited, the exploder will come to rest on ground 21 at a greatly decelerated and controlled rate. It will therefore be appreciated that in acocrdance with this invention the hydraulic cylinder 50 performs the described lift-raise-catch functions in a very efficient manner and with a minimum of hardware.

Although preferred embodiments for carrying out the principle of the invention have been described, it is to be understood that modifications may be made therein without departing from the broader spirit and scope thereof as expressed in the appended claims.

What is claimed is:
1. In combination:
a hydraulic actuator including a cylinder,
an elongated rod having a free end projecting outwardly from said cylinder,
a power piston having an upper face and a lower face for raising and lowering said rod in response to fluid pressure applied against said faces,
said power piston being secured to the other end of said rod and defining at least one longitudinal bore extending between said faces,
a control piston slidably mounted on said rod adjacent to said power piston and normally sealingly engaging the lower face of said power piston,
said pistons being susceptible to relative displacements in response to a substantial force exerted on the free end of said rod, and
said power piston acting as an open valve when said pistons are displaced relative to each other and as a closed valve when said pistons are sealingly engaged.

2. The combination of claim 1 wherein said power piston defines a plurality of longitudinally extending bores between said opposite faces.

3. The combination of claim 2 wherein at least one resilient member couples said power piston to said control piston in sealing engagement.

4. The combination of claim 3 and further including a seismic gas exploder coupled to said free end of said rod.

5. The combination of claim 4 and further including:
support means, and
a gimbal suspension coupling said gas exploder to said support means.

6. The combination of claim 4 wherein
said hydraulic cylinder includes at least one inlet port and one outlet port, and further including:
a hydraulic driving system comprising,
a source of fluid,
hydraulic lines coupling said source to said inlet and outlet ports,
control means coupled externally of said cylinder between said ports,
said control means including a remotely controlled valve and a control device for restricting the fluid flow between said ports, whereby subsequent to an internal explosion in said gas exploder, said exploder is allowed to rise and to exert a substantial force on said rod thereby causing a relative displacement between said pistons, and
the rate of fall of said exploder is determined by said control device.

7. The combination of claim 6 wherein
said cylinder defines an upper chamber between said upper face of said power piston and the walls of said cylinder, and a lower chamber between said lower face of said power piston and the walls of said cylinder, and
said control piston controlling the internal fluid flow between said upper and lower chambers.

8. The combination of claim 7 wherein,
said power piston and said control piston when sealingly engaged act as a united piston for raising and lowering said exploder in response to fluid pressure exerted on said united piston.

9. The combination of claim 8 wherein,
said gimbal suspension allows said exploder to rotate about two intersecting axes.

10. The combination of claim 9 and further including:
a carrier, and
said support means being mounted on said carrier.

References Cited
UNITED STATES PATENTS
3,283,845    11/1966    Kenny _____ 181—.5

RODNEY D. BENNETT, JR., Primary Examiner
C. E. WANDS, Assistant Examiner